(12) United States Patent
Nakashima

(10) Patent No.: US 8,848,908 B2  
(45) Date of Patent: Sep. 30, 2014

(54) IMAGE PROCESSING APPARATUS AND CONTROL METHOD THEREOF

(75) Inventor: Kousuke Nakashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 685 days.

(21) Appl. No.: 12/838,227

(22) Filed: Jul. 16, 2010

(65) Prior Publication Data
US 2011/0033040 A1    Feb. 10, 2011

(30) Foreign Application Priority Data
Aug. 7, 2009    (JP) .................. 2009-184798

(51) Int. Cl.
| | |
|---|---|
| G06F 3/12 | (2006.01) |
| G06F 3/14 | (2006.01) |
| H04N 1/00 | (2006.01) |
| H04N 1/44 | (2006.01) |
| G06F 21/62 | (2013.01) |

(52) U.S. Cl.
CPC ......... H04N 1/00204 (2013.01); H04N 1/4426 (2013.01); G09G 2358/00 (2013.01); H04N 2201/0094 (2013.01); H04N 1/0088 (2013.01); H04N 1/4486 (2013.01); H04N 1/4446 (2013.01); G06F 3/1454 (2013.01); H04N 1/00464 (2013.01); H04N 2201/0039 (2013.01); G09G 2370/027 (2013.01); H04N 1/00244 (2013.01); H04N 1/4433 (2013.01); G09G 2370/025 (2013.01); G06F 21/6263 (2013.01)

USPC .............. 380/51; 380/28; 380/52; 380/53; 380/54; 380/55; 726/2; 726/26; 726/27; 726/32; 726/33

(58) Field of Classification Search
CPC ........... G06F 3/12; G06F 3/14; G06F 3/1454; H04L 9/28
USPC ................. 380/243, 28, 51–55; 726/2, 26–33
See application file for complete search history.

(56) References Cited

U.S. PATENT DOCUMENTS

| | | | |
|---|---|---|---|
| 7,526,812 B2 * | 4/2009 | DeYoung | 726/26 |
| 2006/0077423 A1 | 4/2006 | Mathieson | |
| 2009/0193525 A1 * | 7/2009 | Mitome | 726/30 |

FOREIGN PATENT DOCUMENTS

JP    2006-127503 A    5/2006

* cited by examiner

*Primary Examiner* — Venkat Perungavoor  
*Assistant Examiner* — Amir Mehrmanesh  
(74) *Attorney, Agent, or Firm* — Canon USA, Inc., IP Division

(57) ABSTRACT

An image processing apparatus includes a determination unit configured to determine whether secret information that should not be transmitted to a web server is contained in an HTML file provided by a web server. A web browser does not transmit the secret information determined by the determination unit to the web server. A job control unit executes a device function using the secret information that is not transmitted to the web server according to determination by the determination unit.

9 Claims, 20 Drawing Sheets

FIG. 7

```
SCAN DOCUMENT TO TRANSMIT
IT TO FTP SERVER

SET DOCUMENT AND CLICK EXECUTION BUTTON

FILE NAME          [            ]
ENCRYPTION
PASSWORD           [            ]

[EXECUTION]
```

FIG. 8

```
<form method="post"action="ScanToFTP.cgi">
<p> FILE NAME <input type="text"name="FileName"></p>
<p> PASSWORD <input type="devicePassword"name="stftp:pdfPassword"></p>
<input type="submit"value="EXECUTION">
</form>
```

FIG. 9

| name | value |
|---|---|
| stftp:pdfPassword | ABC12345 |

FIG. 10

```
POST/Scan ToFTP.cgi HTTP/1.1
Content-Type:application/x-www-form-urlencoded
Accept-Encoding:gzip,deflate
Host 192.168.0.100
Content-Length:xx
Connection:Keep-Alive
Cookie:Scan ToFTP_AnonymousAccessCookie=80

FileName=testpd&stftp:pdfPassword=00000000
```

FIG. 12

```
<env:Envelope xmlns:env="http://www.w3.org/2003/05/soap-encoding">
 <env:Body>
  <stftp:PerformJob xmlns:stftp="http://www.xxxxx.com/ns/ScanToFTP/">
   <stftp:requestingUserName>USER001</stftp:requestingUserName>
   <stftp:jobInstruction>
    <stftp:scanSettings>
     <stftp:resolution>300×300<stftp:resolution>
     <stftp:color>Color</stftp:color>
    <stftp:scanSettings>
    <stftp:documentSettings>
     <stftp:documentFormat>Pdf</stftp:documentFormat>
     <stftp:pdfPassword>00000000</stftp:pdfPassword>
    <stftp:documentSettings>
    <stftp:ftpSettings>
     <stftp:host>192.168.0.100</stftp:host>
     <stftp:fileName>test.pdf</stftp:fileName>
    </stftp:ftpSettings>
   </stftp:jobInstruction>
  </stftp:PerformJob>
 </env:Body>
</env:Envelope>
```

FIG. 13

| ID | name | value |
|---|---|---|
| 606087 d4-e318-4f2e-a243-5d2338bf141c | stftp:pdfPassword | ABC12345 |
| ... | ... | ... |
| ... | ... | ... |

```
<env:Envelope xmlns:env="http://www.w3.org/2003/05/soap-encoding">
<env:Body>
<stftp:PerformJob xmlns:stftp="http://www.xxxxx.com/ns/ScanToFTP/">
<stftp:requestingUserName>USER001</stftp:requestingUserName>
<stftp:jobInstruction>
<stftp:scanSettings>
<stftp:resolution>300×300<stftp:resolution>
<stftp:color>Color</stftp:color>
</stftp:scanSettings>
<stftp:documentSettings>
<stftp:documentFormat>Pdf</stftp:documentFormat>
<stftp:pdfPassword>606087d4-e318-4f2e-a243-5d2338bf141c</stftp:pdfPassword>
</stftp:documentSettings>
<stftp:ftpSettings>
<stftp:host>192.168.0.100</stftp:host>
<stftp:fileName>test.pdf</stftp:fileName>
</stftp:ftpSettings>
</stftp:jobInstruction>
</stftp:PerformJob>
</env:Body>
</env:Envelope>
```

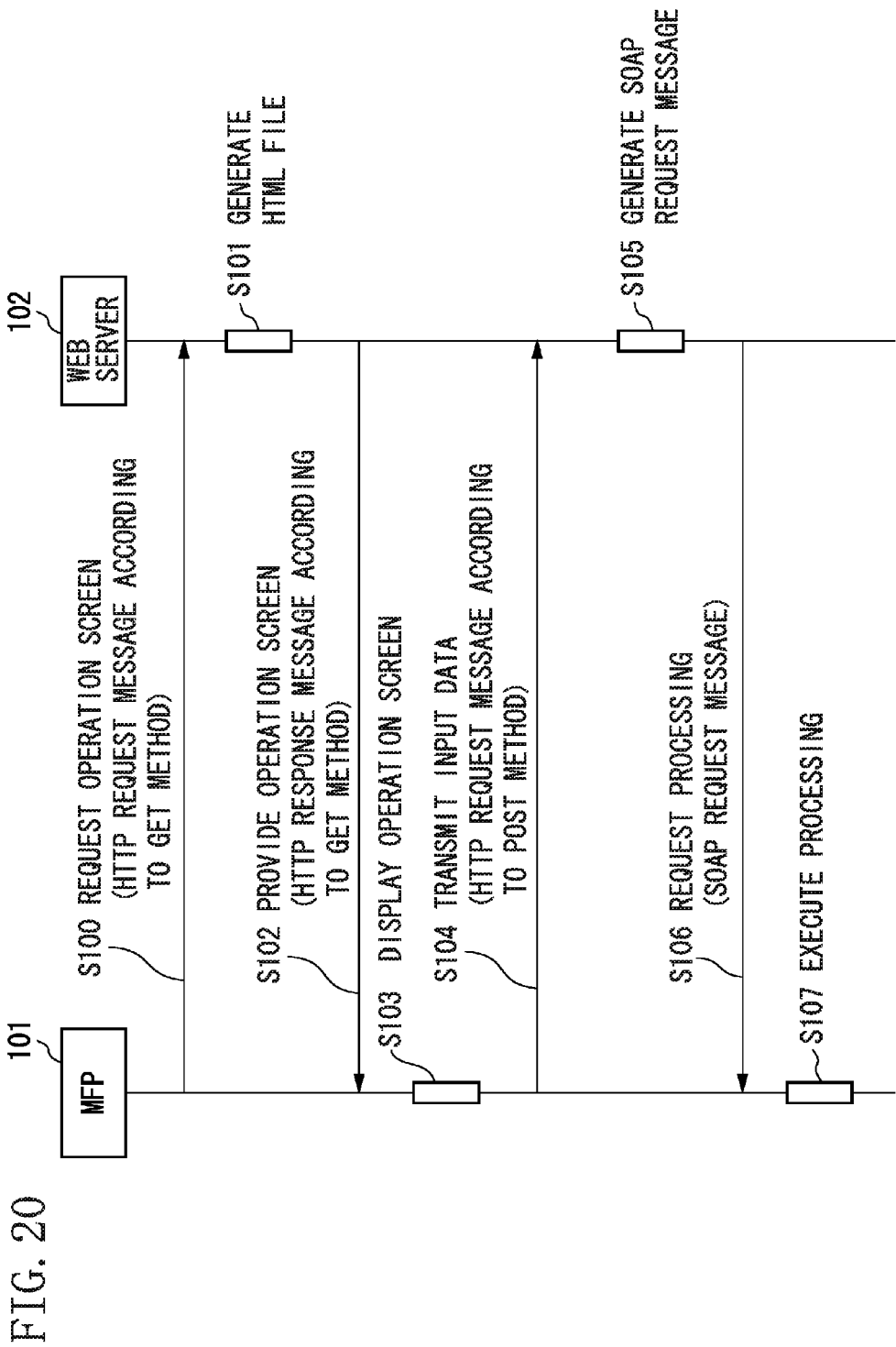

IMAGE PROCESSING APPARATUS AND CONTROL METHOD THEREOF

BACKGROUND OF THE INVENTION

1. Field of the Invention

The present invention relates to an image processing apparatus including a display unit for displaying an operation screen provided by an external apparatus.

2. Description of the Art

An image processing apparatus having functions of a printer, a copying machine, a facsimile machine, and a scanner is commonly known. A multifunction peripheral (MFP) is one such image processing apparatus. The image processing apparatus executes the functions of a printer, a copying machine, a facsimile machine, and a scanner based on an instruction from a user.

Some image processing apparatuses include a display unit such as a web browser which enables access to the external apparatus such as a web server on a network.

Further, such a method is known that an operation screen of the MFP is implemented in a web server and the operation screen of the web server is used by using the web browser installed in the MFP. For example, Japanese Patent Application Laid-open No. 2006-127503 discusses a processing method as described below. The web server provides the operation screen to the MFP. The user who operates the MFP inputs input information via the operation screen displayed by the web browser. Thus input information is notified to the web server via the web browser. The web server generates a processing request (e.g., a printing request or a scanning request) for requesting execution of various types of processing to the MFP according to a content of the input information and transmits the processing request to the MFP. Accordingly, the MFP processes an image based on this processing request.

Owing to a technique discussed in Japanese Patent Application Laid-open No. 2006-127503, it becomes unnecessary for the MFP itself to hold the operation screen for operating the MFP and, therefore, a customization of the operation screen can be done on the web server with ease.

In a case where the operation screen of the MFP is displayed by the web browser, the following issues may occur. In the input information input via the operation screen displayed by the web browser, there is a case where secret information, which the user does not want a third party to know, is contained in the input information. Nonetheless, the secret information maybe transmitted to the web server via the network. As a result thereof, the secret information may be sniffed on the network or in the web server.

For example, a case where a "job for generating an encryption Portable Document Format (PDF)" is executed by using the technique discussed in Japanese Patent Application Laid-open No. 2006-127503 is studied below. In this case, the user enters an encryption password for generating the encryption PDF via the operation screen. The web browser transmits the encryption password to the web server although the encryption password is secret information that the user does not want a third party to know.

SUMMARY OF THE INVENTION

The present invention is directed to a method capable of preventing secret information input via an operation screen, which is displayed by a web browser installed in an image processing apparatus, from being transmitted to a network.

According to an aspect of the present invention, an image processing apparatus that is connectable with an external apparatus via a network includes a first receiving unit configured to receive screen information from the external apparatus, a display unit configured to display an operation screen based on the screen information, a transmission unit configured to transmit input information input via the operation screen to the external apparatus, a second receiving unit configured to receive a processing request generated based on the input information from the external apparatus after the transmission unit transmits the input information, an image processing unit configured to perform image processing based on the processing request received by the second receiving unit, a determination unit configured to determine whether the input information input via the operation screen displayed by the display unit is secret information, and a storage unit configured to store the input information determined by the determination unit to be secret information, wherein, if the determination unit determines that the input information is secret information, the transmission unit does not transmit the input information determined by the determination unit to be secret information, and the image processing unit performs image processing using the input information stored in the storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates a screen of a web browser.

FIG. 8 illustrates a part of a Hyper Text Markup Language (HTML) file representing an operation screen.

FIG. 9 illustrates a secret information list.

FIG. 10 illustrates an example of an HTTP request message.

FIG. 12 illustrates a part of a SOAP request message.

FIG. 13 illustrates another secret information list.

FIG. 14 illustrates a part of another SOAP request message.

FIG. 20 is a flow chart illustrating another flow of the transmission of the HTTP request message.

DESCRIPTION OF THE EMBODIMENTS

Various exemplary embodiments, features, and aspects of the invention will be described in detail below with reference to the drawings.

Figure 1:
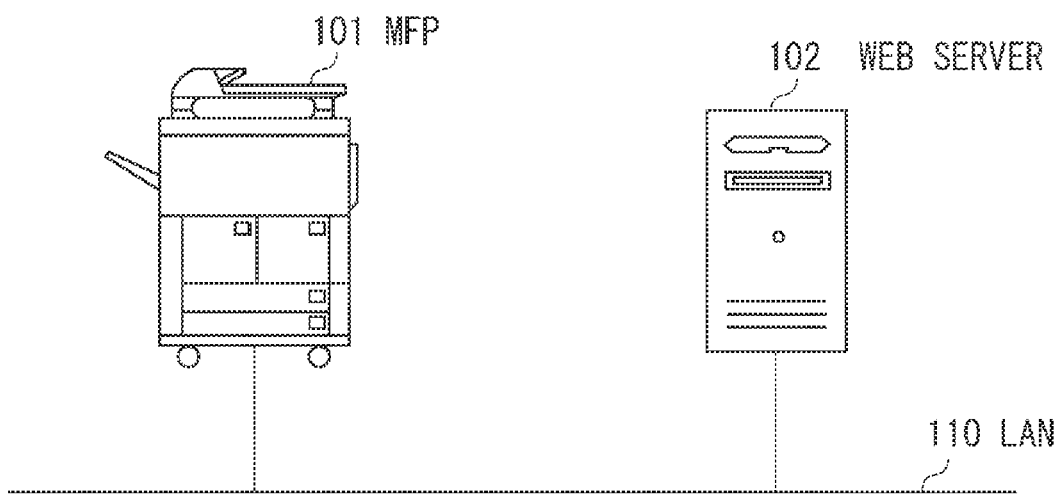
FIG. 1 illustrates an example of a configuration of an image processing system according to an exemplary embodiment of the present invention.

FIG. 1 illustrates a network configuration of an information processing system according to a first exemplary embodiment of the present invention. An MFP 101 and a web server 102 are connected to each other via a local area network (LAN) 110 and thus can communicate each other. The MFP 101 is an example of an image processing apparatus. The web server 102 is an example of an exterior apparatus. There is a File Transfer Protocol (FTP) server (not shown) provided on the LAN 110. Therefore, the MFP 101 or the web server 102 can transmit image data to the FTP server according to an FTP transmission method. The MFP is exemplified here as an example of the image processing apparatus. However, the image processing apparatus in the present invention is not limited to the MFP but may be a single function peripheral (SFP) such as a scanner or a printer. Also, the web server is exemplified here as an example of an external apparatus. However, the external apparatus in the present invention is not limited to the web server but may be the other MFP having a function of the web server or a client's personal computer (PC).

Figure 2:
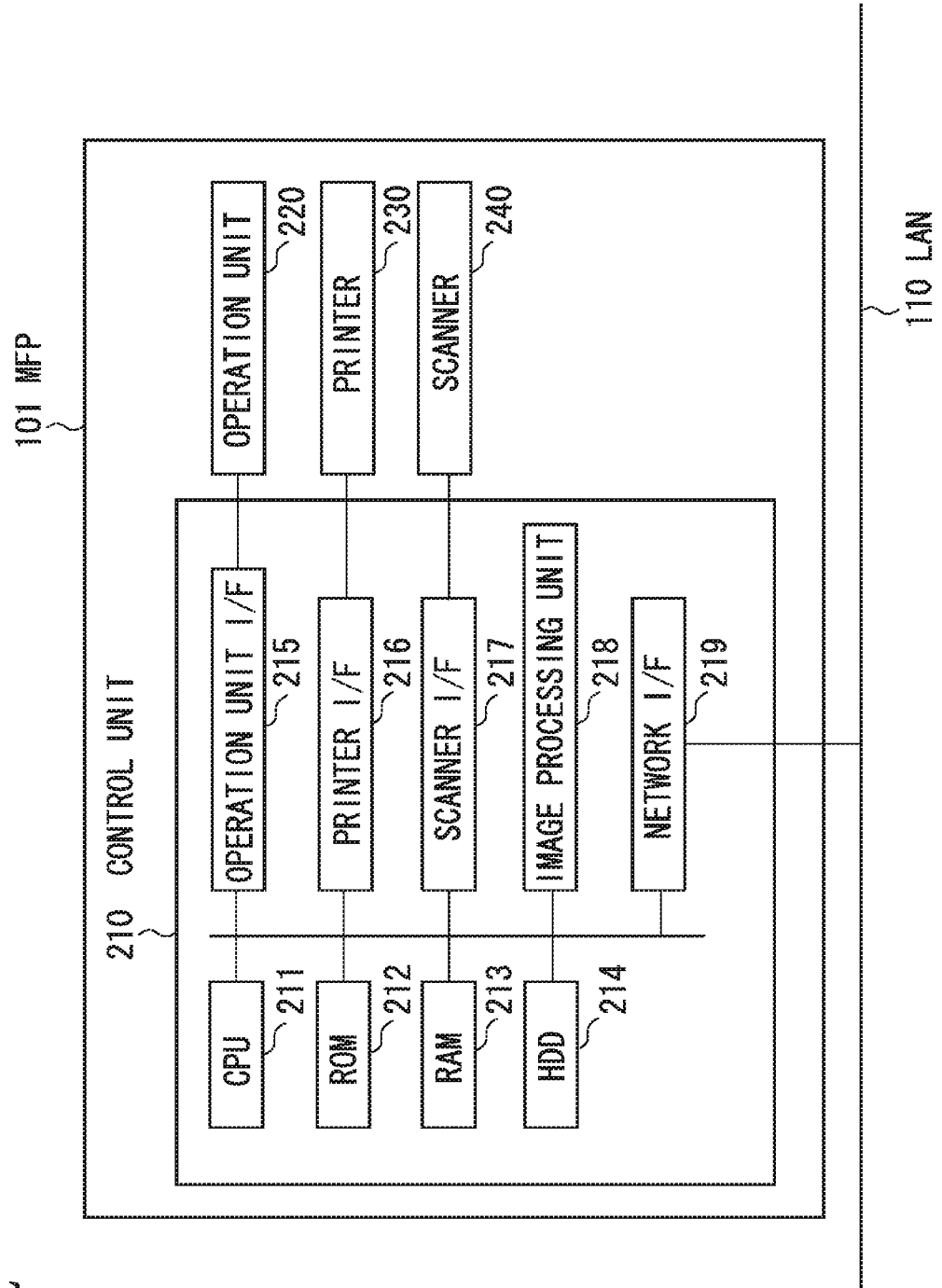
FIG. 2 illustrates a hardware configuration of a multifunction peripheral (MFP).

FIG. 2 illustrates an example of a hardware configuration of the MFP 101. The MFP 101 includes a control unit 210, an operation unit 220, a printer 230, and a scanner 240.

The control unit 210 controls an operation of the MFP 101 in its entirety. The control unit 210 includes a central processing unit (CPU) 211, a read-only memory (ROM) 212, a random access memory (RAM) 213, a hard disk drive (HDD) 214, an operation unit interface (I/F) 215, a printer interface (I/F) 216, a scanner interface (I/F) 217, an image processing unit 218, and a network interface (I/F) 219.

The CPU 211 loads a program stored in the ROM 212 or the HDD 214 to the RAM 213 to execute the program in order to perform various types of control processing.

The ROM 212 stores a boot program of a boot ROM system.

The RAM 213 is a system working memory where the CPU 211 operates. The RAM 213 temporarily stores a program or image data read out by the CPU 211.

The HDD 214 stores image data, various programs or below described various information tables.

The operation unit I/F 215 is configured to connect the operation unit 220 with the control unit 210. The operation unit 220 includes a liquid crystal display unit having a touch panel function or a keyboard.

The printer I/F 216 is configured to connect the printer 230 with the control unit 210. The printer 230 receives image data from the control unit 210 via the printer I/F 216 and prints the image data onto a print medium.

The scanner I/F 217 is configured to connect the scanner 240 with the control unit 210. The scanner 240 reads an image on a document to generate image data and inputs the image data to the control unit 210 via the scanner I/F 217.

The image processing unit 218 processes the image data acquired by the scanner 240 reading the document. Alternatively, the image processing unit 218 processes the image data to be output to the printer 230. In the present exemplary embodiment, the image processing unit 218 performs processing to generate a PDF file, for example.

The network I/F 219 is configured to connect the control unit 210 with the LAN 110. The network I/F 219 is configured to transmit image data or various types of information to the web server 102 on the LAN 110 or receive various types of information from the external apparatus on the LAN 110.

Figure 3:
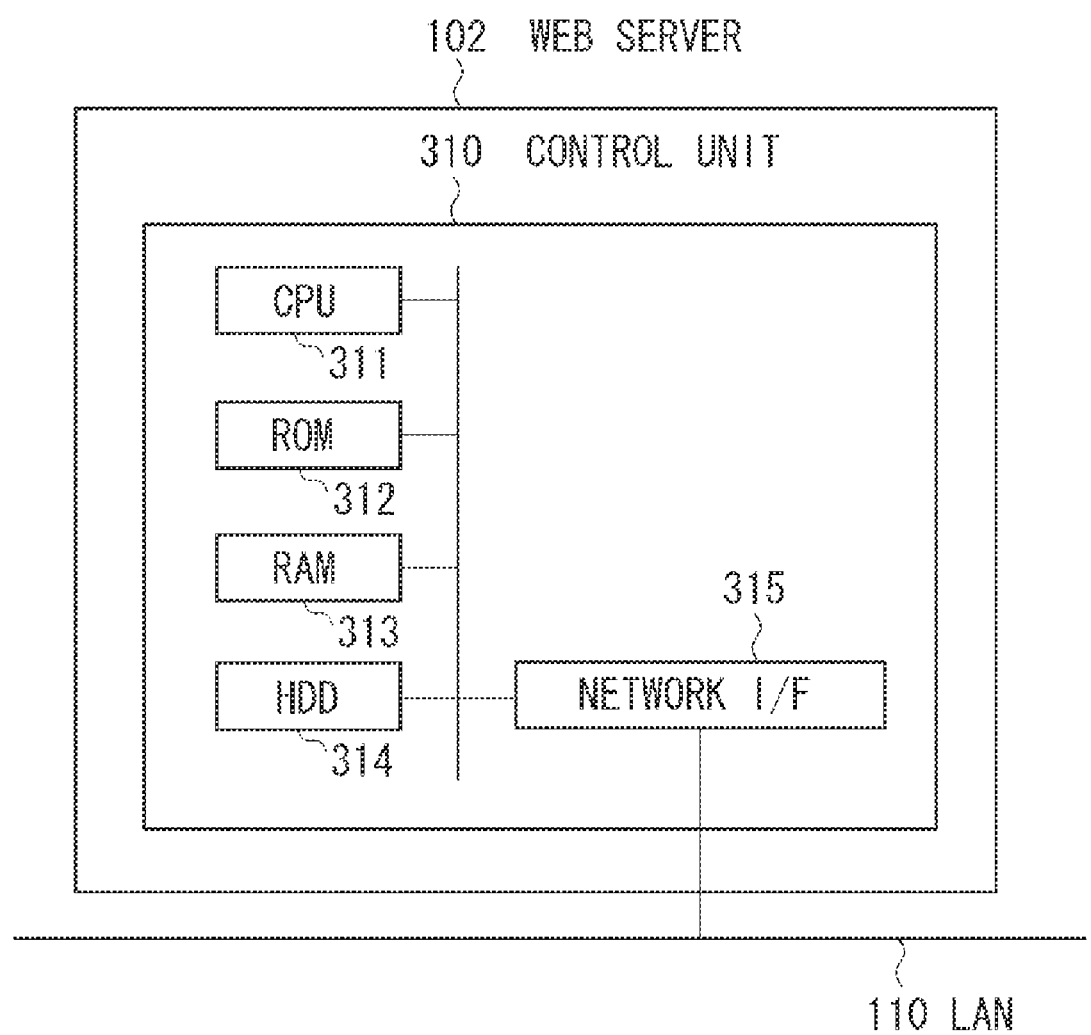
FIG. 3 illustrates a hardware configuration of a web server.

FIG. 3 illustrates an example of a hardware configuration of the web server 102.

The web server 102 includes a control unit 310. The control unit 310 includes a CPU 311, a ROM 312, a RAM 313, a HDD 314, and a network I/F 315.

The CPU 311 controls an operation of the web server 102 in its entirety. More specifically, the CPU 311 loads a program stored in the ROM 312 or the HDD 314 to the RAM 313 to execute the program thereon, thereby executing various types of control processing.

The ROM 312 stores a boot program of a boot ROM system.

The RAM 313 is a system working memory where the CPU 211 operates. The RAM 313 temporarily stores a program, image data or the like read out by the CPU 211.

The HDD 314 stores image data and various programs.

The network I/F 315 is configured to connect the control unit 310 (i.e., the web server 102) with the LAN 110. The network I/F 315 transmits various types of information between the control unit 310 and the other apparatus on the LAN 110.

A functional configuration of a program executed on the MFP 101 is described with reference to FIG. 4.

Figure 4:
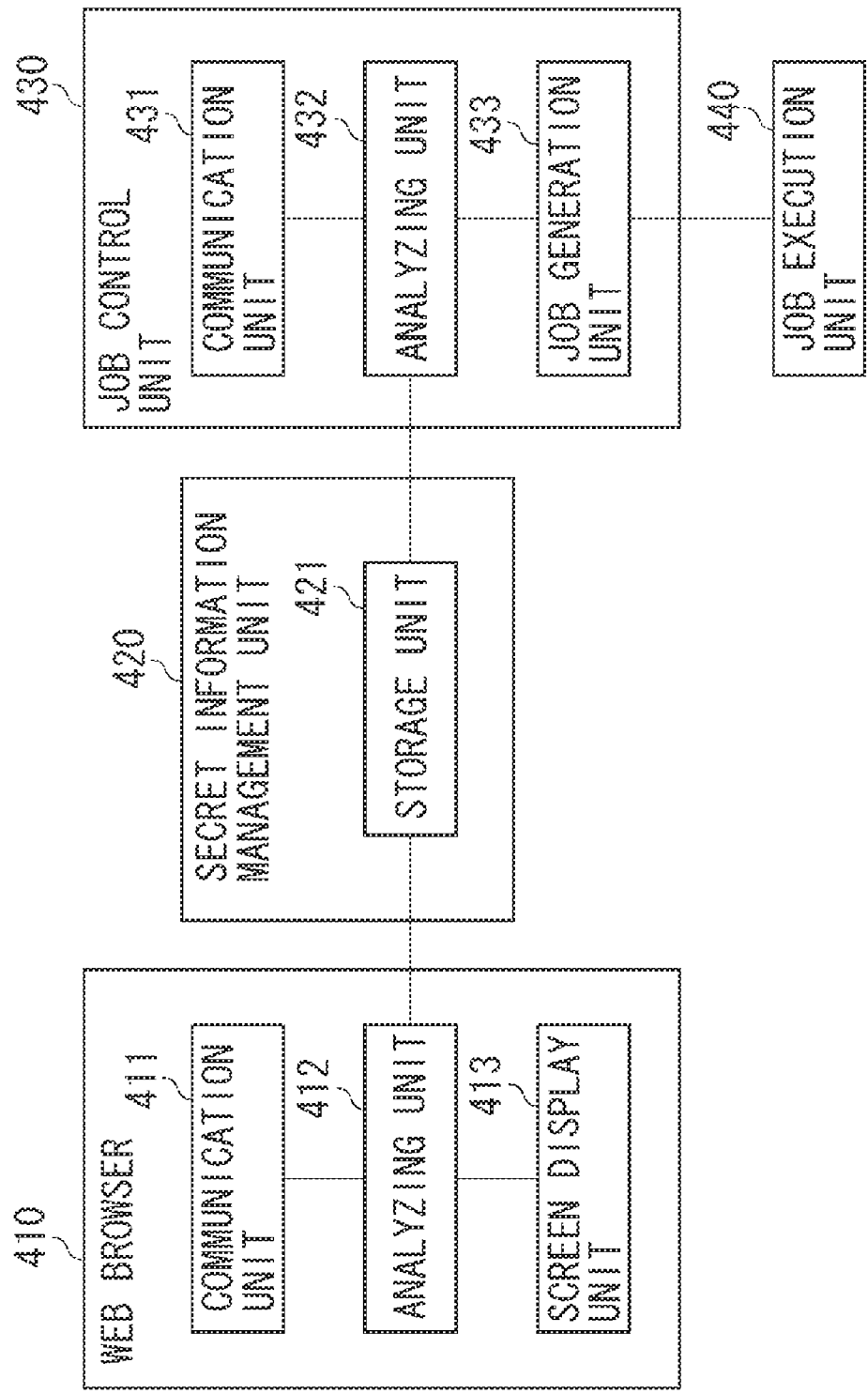
FIG. 4 illustrates a software configuration of the MFP.

FIG. 4 is a block diagram illustrating an example of a functional configuration of the program loaded on the RAM 213 of the MFP 101 according to the present exemplary embodiment.

The program executed by the MFP 101 includes a web browser 410, a secret information management unit 420, a job control unit 430, and a job execution unit 440.

The web browser 410 has a function to display the operation screen on the operation unit 220 based on a description of a Hyper Text Markup Language (HTML) file acquired from the web server 102. Further, the web browser 410 has a function to transmit input information input via the displayed operation screen to the web server 102. Hereinafter, the web browser is exemplified for the sake of explanation. However, the web browser may be another type of software that displays the operation screen based on screen information described by a language other than HTML. Also, the web server maybe another type of server which transmits screen information described by a language other than HTML.

The web browser 410 includes a communication unit 411, an analyzing unit 412, and a screen display unit 413.

The communication unit 411 establishes a communication according to a Hyper Text Transfer Protocol (HTTP) by using the network I/F 219 illustrated in FIG. 2. The communication unit 411 transmits an HTTP request message or an HTTP response message between the communication unit 411 and a web application 510. The communication unit 411 transmits the HTTP request message to the web application 510 according to either one of a GET method or a POST method.

In a case where the HTTP request message is transmitted according to the GET method, the web browser 410 identifies a Uniform Resource Locator (URL) indicative of the operation screen. In a case where the HTTP request message is transmitted according to the POST method, a form is contained in the HTML file. Input information input into an input form of the operation screen by the user is encoded by the communication unit 411. The communication unit 411 transmits the encoded information, i.e., data input into the form, to the web server 102 together with the HTTP request message.

The analyzing unit 412 analyzes the HTTP response message received from the web application 510 via the communication unit 411. The HTTP response message contains screen information (i.e., HTML file) for causing the web browser 410 to display the operation screen.

The screen display unit 413 displays an operation screen on the operation unit 220 based on an analysis result by the analyzing unit 412. Hereinafter, the screen displayed based on the HTML file contained in the HTTP response message which is received from the web server 102 is referred to as the "web browser screen".

A secret information management unit 420 is configured to manage the secret information in the input information input on the web browser screen. The secret information management unit 420 includes a storage unit 421.

The storage unit 421 temporarily stores the secret information in the RAM 213 or the HDD 214.

The job control unit 430 is configured to provide a processing request received from the web server 102 as a web service. The job control unit 430 includes a communication unit 431, an analyzing unit 432, and a job generation unit 433.

The communication unit 431 receives a Simple Object Access Protocol (SOAP) request message from the web application 510 by using the network I/F 219 illustrated in FIG. 2. The SOAP request message is a message containing a processing request for requesting the MFP 101 to execute various kinds of processing. In the present exemplary embodiment, the communication unit 431 is different from the communication unit 411. However, the communication unit 411 may also be identical to the communication unit 431 of the web browser 410. The SOAP is used as the communication protocol here. However, another protocol may be used to receive the processing request.

The analyzing unit 432 analyzes the SOAP request message which is received by the communication unit 431. The analysis may be performed by an analyzing unit that is identical to the analyzing unit 412 included in the web browser 410.

The job generation unit 433 generates a job for executing the processing request analyzed by the analyzing unit 432.

The job execution unit 440 executes a job generated by the job generation unit 433 of the job control unit 430. The job execution unit executes print processing by the printer 230, reading processing by the scanner 240, transmission processing via the network I/F 219, encryption PDF generation processing by the image processing unit 218, and the like.

Figure 5:
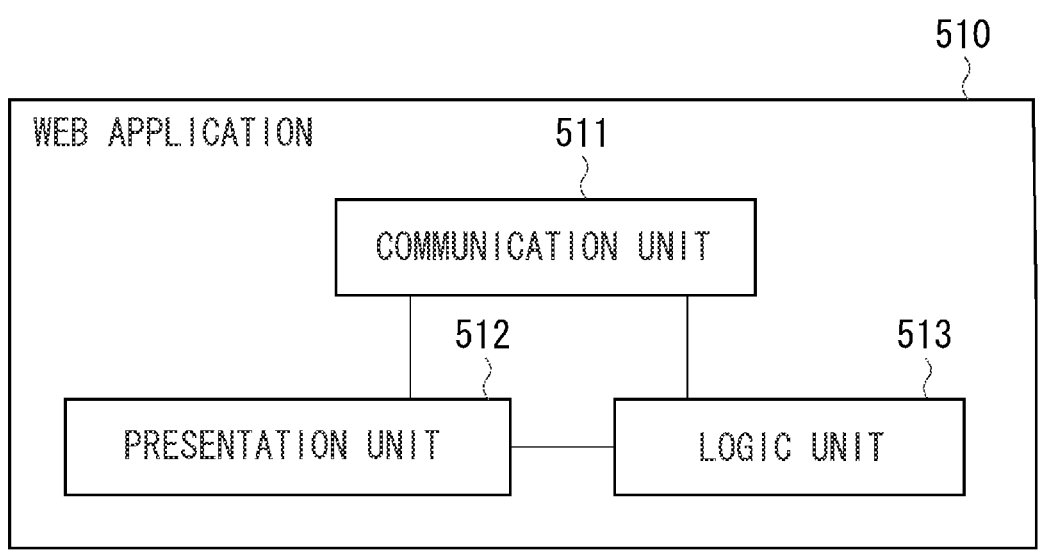
FIG. 5 illustrates a software configuration of the web server.

A functional configuration of an application executed on the web server 102 is described below with reference to FIG. 5. FIG. 5 is a block diagram illustrating an example of the functional configuration of the web application 510, which is loaded on the RAM 313 of the web server 102 according to the present exemplary embodiment.

The web application 510 has functions of providing the operation screen to be displayed on the operation unit 220 and generating a processing request to be executed by the image processing unit 218. The web application 510 includes a communication unit 511, a presentation unit 512, and a logic unit 513.

The communication unit 511 communicates with the web browser 410 and the job control unit 430. For example, the communication unit 511 receives the HTTP request message from the web browser 410 and transmits the HTTP response message to the web browser 410. Also, the communication unit 511 transmits the SOAP request message to the job control unit 430.

The presentation unit 512 analyzes the HTTP request message received by the communication unit 511 and generates an HTML file indicative of screen information to be displayed on the web browser 410 of the MFP 101. The communication unit 511 transmits the HTTP response message containing the HTML file to the web browser 410.

The logic unit 513 analyzes the HTTP request message received by the communication unit 511 and executes various types of processing based on the analysis result. An example of the various types of processing executed by the logic unit 513 includes a control instruction to the MFP 101. In a case where the control instruction is issued to the MFP 101, the logic unit 513 generates the SOAP request message indicative of processing request, which can be processed by the job control unit 430 of the MFP 101. This SOAP request message is transmitted to the job control unit 430 by the communication unit 511.

Now, a flow of the processing performed between the MFP 101 and the web server 102 is described in its entirety with reference to the sequence chart of FIG. 20. More specifically, the processing that the MFP executes a function thereof by using the operation screen provided by the web server is described.

In step S100, the web browser 410 of the MFP 101 transmits the HTTP request message for requesting the operation screen according to the GET method. In the HTTP request message according to the GET method, a URL indicative of the operation screen to be used in operating the MFP is identified.

In step S101, the presentation unit 512 of the web server 102 generates or acquires the HTML file for indicating the operation screen.

In step S102, the communication unit 511 transmits thus generated operation screen to the web browser 410 as the HTTP response message according to the GET method.

In step S103, the analyzing unit 412 analyzes the HTML file contained in the HTTP response message and the screen display unit 413 displays the web browser screen.

In step S104, the web browser 410 transmits the HTTP request message, to which the input information input via the operation screen is attached, according to the POST method.

In step S105, the logic unit 513 generates the SOAP request message for requesting processing, e.g., requesting printing, to the MFP.

In step S106, the communication unit 511 transmits the thus generated SOAP request message to the job control unit 430. The communication unit 431 at the side of the MFP 101 receives the SOAP request message.

In step S107, the analyzing unit 432 analyzes the received SOAP request message, the job generation unit generates a job and the job execution unit 440 executes processing of the job.

FIG. 7 illustrates an example of a web browser screen to be displayed in step S103 of FIG. 20. The web browser screen illustrated in FIG. 7 is an operation screen used to scan a document to generate an encryption PDF file and to transmit the generated file to the FTP server. The operation screen includes a file name input field, an encryption password input field, and an execution button. The file name input field is configured to input a name of the PDF file. The encryption password input field is configured to enter a password for encrypting the PDF. The encryption password is used when the image processing unit 218 generates the encryption PDF file and is also used later as a key to be required to encode or decode the generated encryption PDF file when browsing or editing the encryption PDF file. The execution button is configured to instruct the web application 510 to execute the transmission processing of the PDF file.

FIG. 8 illustrates a part of the HTML file describing the web browser screen illustrated in FIG. 7. The analyzing unit 412 analyzes the HTML file and the screen display unit 413 displays the web browser screen illustrated in FIG. 7.

Generally, the information input into each of the file name input field and the encryption password input field is forced to be transmitted to the web application 510 when the execution button is clicked illustrated in FIG. 8. The transmitted information may be sniffed by third party on the communication path or from the web server 102. The encryption password especially is the important information in keeping the secrecy of the encryption PDF file. Therefore, there is a case where the user does not want to transmit the information to the network. According to the present exemplary embodiment, a type attribute and a name attribute are defined to an <input> tag of the HTML file illustrated in FIG. 8. The type attribute determines whether the information input into the input field illustrated in FIG. 7 is the secret information. The name attribute indicates an element of the SOAP request message to be transmitted to the MFP 101 by the web application 510. More detailed description thereof is made below.

Figure 6:
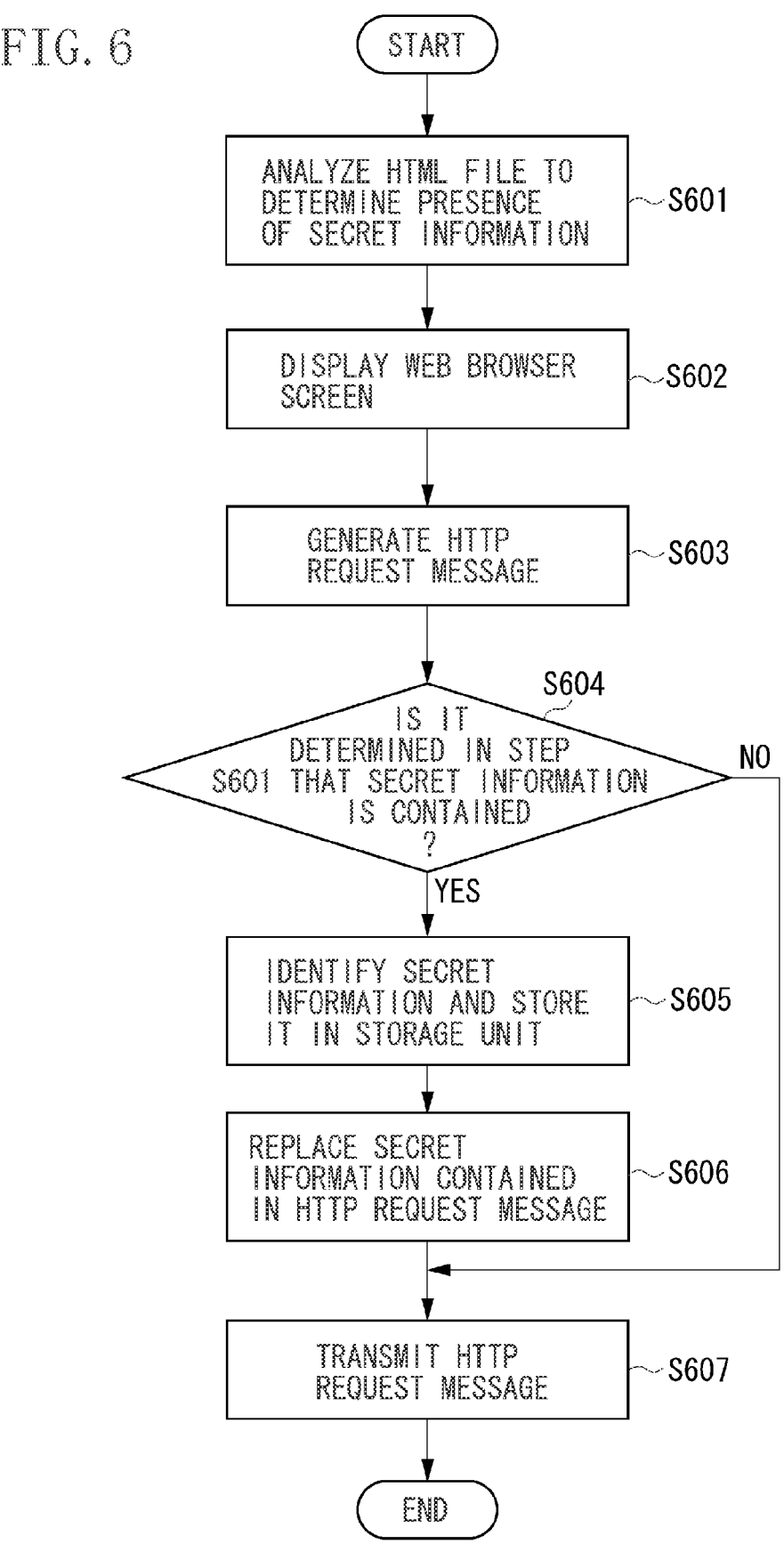
FIG. 6 is a flow chart illustrating a flow of a transmission of a Hyper Text Transfer Protocol (HTTP) request message.

FIG. 6 is a flow chart illustrating processing steps of the MFP 101 according to the present exemplary embodiment. Each operation illustrated in the flow chart of FIG. 6 is realized by the CPU 211 executing the program stored in the ROM 212. Each operation illustrated in the flow chart is executed by the communication unit 411, the analyzing unit 412, or the screen display unit 413 included in the web browser 410. In the present exemplary embodiment, such execution processing of a job is exemplified that "a document is scanned to generate an encryption PDF file and the thus generated encryption PDF file is transmitted to the FTP server".

The processing of the flow chart illustrated in FIG. 6 is started when the HTML file is received from the web server 102.

In step S601, the analyzing unit 412 analyzes the received HTML file to cause the operation unit 220 to display the web browser screen. At that time, the analyzing unit 412 analyzes whether a "device Password" is described as the type attribute value of the <input> tag. In a case where the "device Password" is described in the type attribute of the <input> tag, the analyzing unit 412 determines that the secret information is contained in the information input via the web browser screen. In step S602, the screen display unit 413 displays the web browser screen on the operation unit 220. The user inputs information into the file name input field and the encryption password input field via the displayed web browser screen. The web browser 410 displays the information input into the input field, of which type attribute value of the <input> tag is the "device Password", in the form of "*". In step S603, the analyzing unit 412 generates the HTTP request message when the analyzing unit 412 detects a click of the execution button in a state that the information is input in the input field of the web browser screen illustrated in FIG. 7.

The encryption password is used as an example of the input information to be input into the secret information field in the present analysis processing. However, the information to be input into the secret information field is not to be restricted to the encryption password. The secret information field can be set according to a type of the job. For example, a facsimile number is input into the secret information field in the case of a facsimile sending job and an address is input into the secret information field in the case of a mail transmission job. In a case where all the pieces of the information input by the user via the operation screen are not desired to be transmitted to the outside of the MFP, it can be realized that the input information is not transmitted to the web server 102 if all the pieces of data to be input into the form are determined as the secret information in step S603. In this case, all the pieces of input information are stored in a secret information list.

In step S604, in a case where the analyzing unit 412 determines that the secret information is contained as the result of the HTML file analysis instep S601 (YES in step S604), the processing proceeds to step S605. In a case where the analyzing unit 412 determines that the secret information is not contained as the result of the HTML file analysis in step S601 (NO in step S604), the processing proceeds to step S607.

Figure 9:
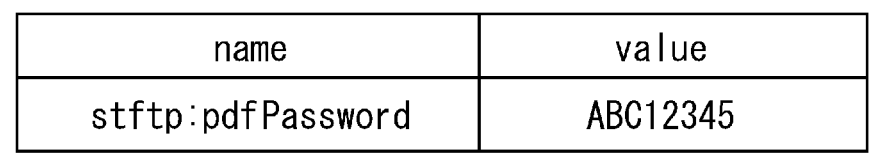

In step S605, the analyzing unit 412 identifies the secret information and stores the thus identified secret information in the storage unit 421. The information to be identified as to whether it is the secret information is to be input into the file name input field and the information input into the encryption password input field of the operation screen illustrated in FIG. 7. As described above, each of the input fields indicated by the <input> tag of the HTML file described in FIG. 8 has the type attribute and the name attribute. In a case where the type attribute value is the "device Password", the information input into the field is identified as the secret information, and the name attribute value corresponding to the type attribute value is stored in the storage unit 421. In the present exemplary embodiment, the "stftp:pdfPassword" defined as the name attribute value and the information input via the web browser screen are stored in the storage unit 421 as the value attribute values. The name attribute value is an element of the SOAP request message to be transmitted by the web application 510 to the MFP 101. The SOAP request message is described below in detail with reference to FIG. 11. As described above, in a case where the type attribute value of the <input> tag is the "device Password", the information input into the input field is identified as the secret information, and the name attribute value and a value input into the input field are stored in the storage unit 421. FIG. 9 schematically illustrates an example of the secret information list to be stored in the storage unit 421. The secret information list has the name attribute value and the value attribute value. The name attribute value is the name attribute value of the <input> tag. The value attribute is the attribute for storing the value input into the input field indicated by the <input> tag. For example, in a case where an "ABC12345" is input into the secret information input field of the web browser screen, the name attribute of "stftp:pdfPassword" and the value attribute of the "ABC12345" are added to the secret information list.

In step S606, the analyzing unit 412 replaces the secret information contained in the HTTP request message with a predetermined default value. The default value is preliminary defined for each name attribute of the <input> tag. For example, "00000000" is preliminary defined as the default value in the name attribute of "stftp:pdfPassword". Therefore, "ABC12345" contained in the HTTP request message is replaced with "00000000".

FIG. 10 illustrates an example of the HTTP request message of which secret information identified in step S605 has been replaced with the default value. The HTTP request message illustrated in FIG. 10 corresponds to the HTML file illustrated in FIG. 8. In the HTTP request message, "test.pdf" and "00000000" are described as "FileName" described in the HTML file and data corresponding to "stftp:devicepassword", respectively.

In step S607, the communication unit 413 transmits the HTTP request message illustrated in FIG. 10. The web browser 410 transmits the HTTP request message to the web server 102.

Generally, the input information input by the user via the web browser screen displayed by the web browser 410 is transmitted to the web server. However, in the present exemplary embodiment, processing in steps S601 through S607 is performed so as to propose such a system that the secret information contained in the input information is not transmitted to the web server. With the above processing, the information that has been determined as the secret information in the input information is transmitted to the web server 102 after the information is replaced with the default value and the default value is transmitted to the web server 102, so that the secret information is prevented from being leaked to outsiders.

Figure 11:
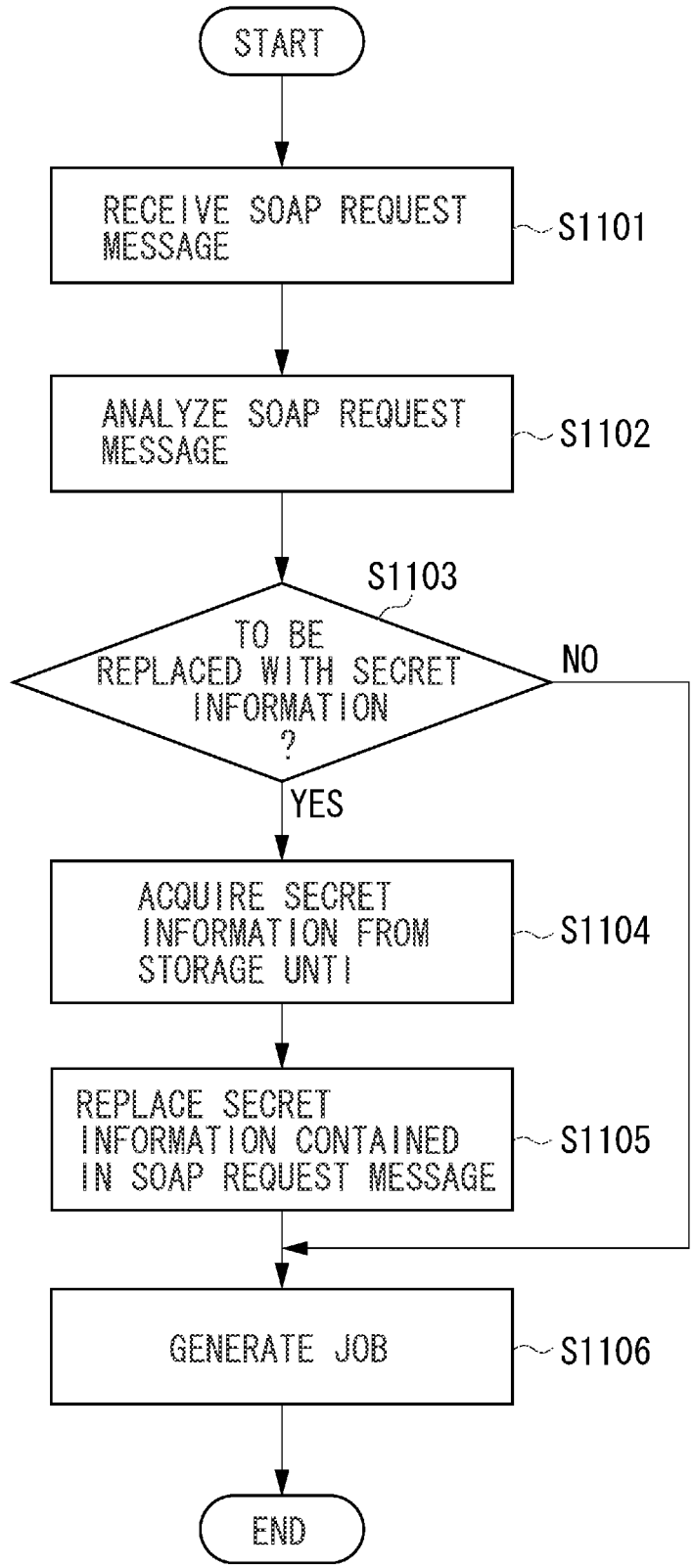
FIG. 11 is a flow chart illustrating a flow of Simple Object Access Protocol (SOAP) request processing.

FIG. 11 is a flow chart illustrating a flow of processing before the job is executed after the SOAP request message is received from the web application. In the flowchart of FIG. 11, similar to the flow chart of FIG. 6, such a job is exemplified that the document is scanned to generate a PDF file thereof and to transmit the PDF file to the FTP server. Each operation illustrated in the flow chart of FIG. 11 is realized by the CPU 211 executing the control program. Each operation illustrated in the flow chart is executed by the communication unit 431, the analyzing unit 432, or the job generation unit 433 of the job control unit 430.

In the flowchart of FIG. 6, determination processing in step S601 for determining whether secret information is contained is performed immediately after the HTML file is received from the web server 102. However, the determination processing is not necessarily performed at this timing. For example, the determination processing for determining whether the input information is secret information may be performed after the information is input into the input field of the web browser screen.

In step S1101, the communication unit 431 receives the SOAP request message. In step S1102, the analyzing unit 432 of the job control unit 430 analyzes the SOAP request message. FIG. 12 illustrates apart of the SOAP request message received from the web application 510. The SOAP request message illustrated in FIG. 12 makes an instruction to scan the document, convert it into the PDF file, and transmit the PDF file to the FTP server. Resolution of 300×300 and full color are designated to a scan setting, PDF format and the encryption password 00000000 are designated to a document setting, and a host address of 192.168.0.100 and a file name of test.pdf are designated to an FTP setting.

In step S1103, the analyzing unit 432 determines whether the information to be replaced with the secret information stored in the secret information list is contained in the SOAP request message. In other words, the analyzing unit 432 determines whether an element of "stftp:pdfPassword" as the name attribute of the secret information list is contained in the SOAP request message. In a case where the element of "stftp: pdfPassword" is contained in the SOAP request message (YES in step S1103), the processing proceeds to step S1104.

In step S1104, the analyzing unit 432 acquires the secret information stored in the storage unit 421 of the secret information management unit 420. In a case where the storage unit 421 stores the secret information list illustrated in FIG. 9, the analyzing unit 432 acquires the secret information which has "stftp:pdfPassword" as the name attribute and "ABC12345" as the value attribute. After the analyzing unit 432 acquires the secret information, the secret information stored in the secret information list of the storage unit 421 is deleted.

In step S1105, the analyzing unit 432 replaces the secret information contained in the SOAP request message with the secret information acquired in step S1104. The content of the element is replaced with the value attribute of the secret information within the SOAP request message. In the case of the SOAP request message illustrated in FIG. 12, the content of "00000000" of the element of "stftp:pdfPassword" is replaced with the value attribute of "ABC12345" of the acquired secret information.

In step S1106, the job generation unit 433 generates a job according to a processing request analyzed by the analyzing unit 432. The job execution unit 440 executes the job based on thus generated job. The content of the job in the present exemplary embodiment represents a job including a series of processing in which the document is scanned, an encryption PDF is generated based on the scanned image, and the encryption PDF is transmitted to the FTP server. In other words, the image data read by the scanner 240 is transmitted to the image processing unit 218 via the scanner I/F 217 based on the analysis result of the SOAP request message. Then, after the image processing unit 218 converts the image data into the encryption PDF file, the processing for transmitting the encryption PDF file to the FTP server is sequentially performed via the network I/F 219.

As described above, in the exemplary embodiment of the present invention, a risk that the secret information input via the web browser screen is sniffed via the network can be reduced.

In the present exemplary embodiment, the MFP 101 is configured, but not limited, to include the secret information management unit 420. For example, the MFP 101 may have such a configuration that a proxy server is disposed between the MFP 101 and the web server 102 and the proxy server includes the secret information management unit 420. In this case, in the way of transmitting the HTTP request message from the MFP 101 to the web server 102, the HTTP request message is temporarily transmitted to the proxy server and the secret information is replaced with the default value in the proxy server. The secret information is communicated between the MFP 101 and the proxy server while security can be kept between the proxy server and the web server 102.

The MFP 101 also may be configured such that both of the HTTP request message and the SOAP request message are communicated by using a transport layer protocol (HTTPS) of which secrecy is secured by a Secure Sockets Layer (SSL) or the like. In this case, prevention of leakage of the secret information is not performed within the web server 102. However, the information leakage prevention effect can be produced while the information is transmitted via the communication path.

In the determination processing in step S603, whether the input information input via the web browser screen is secret information is determined. However, even in a case where the input information is determined as secret information, there is a case where the secret information is required in processing the application on the web server. For example, when the above described series of job in which "the document is scanned to generate the encryption PDF file and the thus generated encryption PDF file is transmitted to the FTP server" is executed, such a case is considered that a portion of the processing in which "the encryption PDF is generated" is submitted to the image processing unit (not shown) of the web server 102. In other words, such a case is considered that the MFP 101 does not have a function to generate the encryption PDF and the generation of the encryption PDF is submitted to the web server 102. In this case, even in a case where the information is determined as secret information in step S603, the secret information may be transmitted. In this case, the problem can be resolved such that a type attribute which identifies whether the input information determined as secret information is the input information to be used in the image processing unit 218 of the MFP 101 is newly defined in the HTML file. Then, the web browser 410 determines whether the input information is the information to be used in the image processing unit 218. In this case, it is desirable that the input information that has been determined as secret information is transmitted to the web server after the input information is encrypted.

Now, a second exemplary embodiment of the present invention is described below. In the second exemplary embodiment, such an example is described that a secret information identification ID, instead of the default value, is embedded into the request message, which is generated by the MFP 101, to be transmitted to the web server 102. A hardware configuration of each of the MFP 101 and the web server 102 is similar to the corresponding one of the first exemplary embodiment.

Initially, a flow of processing in which the MFP 101 transmits the HTTP request message to the web server 102 is described by using the flow chart of FIG. 6. In each of the steps except for steps S605 and S606, the processing similar to what is described in the first exemplary embodiment is performed.

Figure 13:
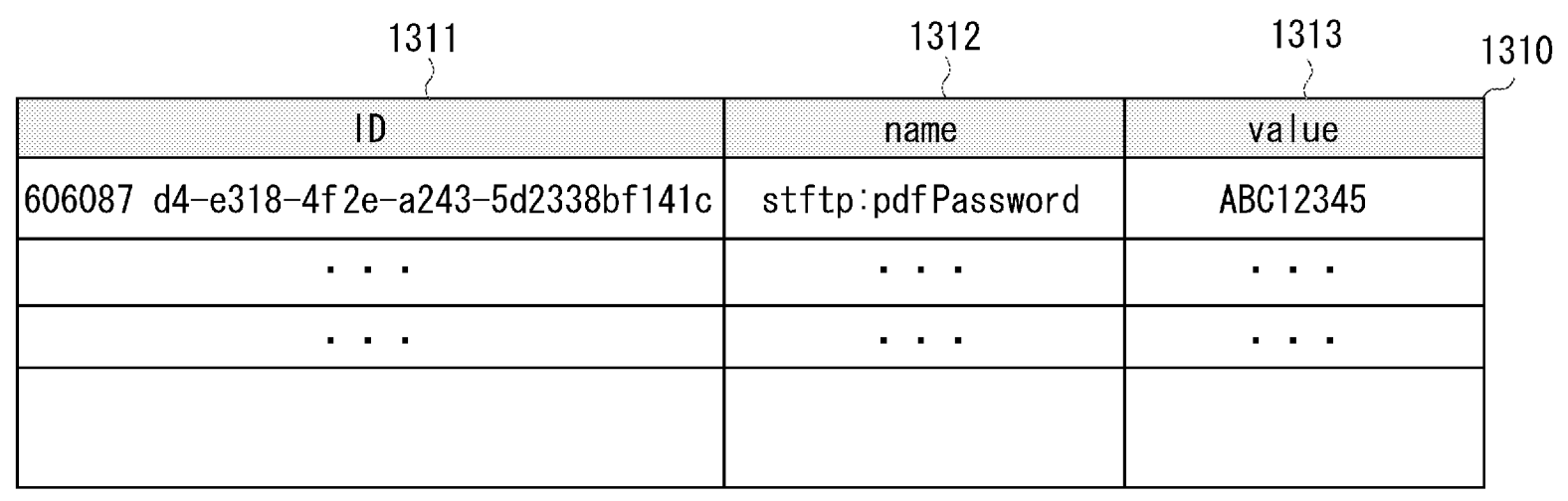

In step S605, the analyzing unit 412 of the web browser 410 stores the secret information in the storage unit 421 of the secret information management unit 420 as well as generates a unique ID (hereinafter referred to as the "secret information ID") as identification information for identifying the thus stored secret information. Then, the secret information ID is related to the secret information to be stored. The secret information ID may be generated by using a Universally Unique Identifier (UUID). FIG. 13 schematically represents an example of the secret information list to be stored in the storage unit 421 in the form of a table. The secret information list has an ID attribute, a name attribute, and a value attribute. The ID attribute is configured to store the secret information ID. The name attribute is configured to store the name attribute of the <input> tag of the HTML file. The value attribute is configured to store a value input into the input field indicated by the <input> tag of the HTML file. For example, in a case where "ABC12345" is entered into the encryption password input field, the ID attribute value of "606087d4-e318-4f2e-a243-5d2338bf141c", the name attribute value of "stftp:pdfPassword", and the value attribute value of "ABC12345" are added to the secret information list.

In step S606, the input information that has been determined as secret information in the HTTP request message is replaced with the generated secret information identification ID.

Now, a description is made as to processing of the SOAP request message received from the web server 102 in the MFP 101 with reference to the flow chart of FIG. 11. In each of the steps except for steps S1103 and S1104, processing similar to the processing described in the first exemplary embodiment is performed.

In step S1104, the analyzing unit 432 acquires the secret information stored in the storage unit 421. In a case where the secret information identification ID is specified in the SOAP request message, the analyzing unit 432 searches the secret information list according to the secret information identification ID and acquires an element of the value attribute corresponding to the secret information ID. For example, in a case where the secret information list illustrated in FIG. 13 is stored in the storage unit 421, the analyzing unit 432 acquires the secret information having the name attribute of "stftp:pdfPassword" and the value attribute of "ABC12345". After the analyzing unit 432 acquires the secret information, the secret information management unit 420 deletes the secret information from the secret information list.

In step S1105, the analyzing unit 432 replaces the secret information contained in the SOAP request message with the secret information acquired from the storage unit 421. In a case of the SOAP request message illustrated in FIG. 14, the content of "606087d4-e318-4f2e-a243-5d2338bf141c" of the element of the "stftp:pdfPassword" is replaced with the value attribute value "ABC12345" of the secret information acquired from the storage unit 421.

In a case where a predetermined time has passed while the secret information in the secret information list is not used, the secret information is automatically deleted.

An address of the server, from which the HTML file of the web browser including the <input> element was acquired, may also be stored in the secret information. In this case, in step S1105, the transmission source address of the SOAP request message is compared with the address contained in the secret information and, in a case where the addresses do not match each other, the replacement in step S1004 is inhibited. Accordingly, such an effect that the apparatus is prevented from being operated according to a spoofing processing request is produced. More specifically, the secret information stored according to an instruction from the web server 102 can be prevented from being used when the processing request is transmitted from another web server.

Now, a third exemplary embodiment of the present invention is described below. In the third exemplary embodiment, such an example is described that, after the MFP 101 received the SOAP request message from the web server 102, the MFP 101 accepts the secret information. A hardware configuration of each of the MFP 101 and the web server 102 is similar to the corresponding one of the first exemplary embodiment.

Figure 15:
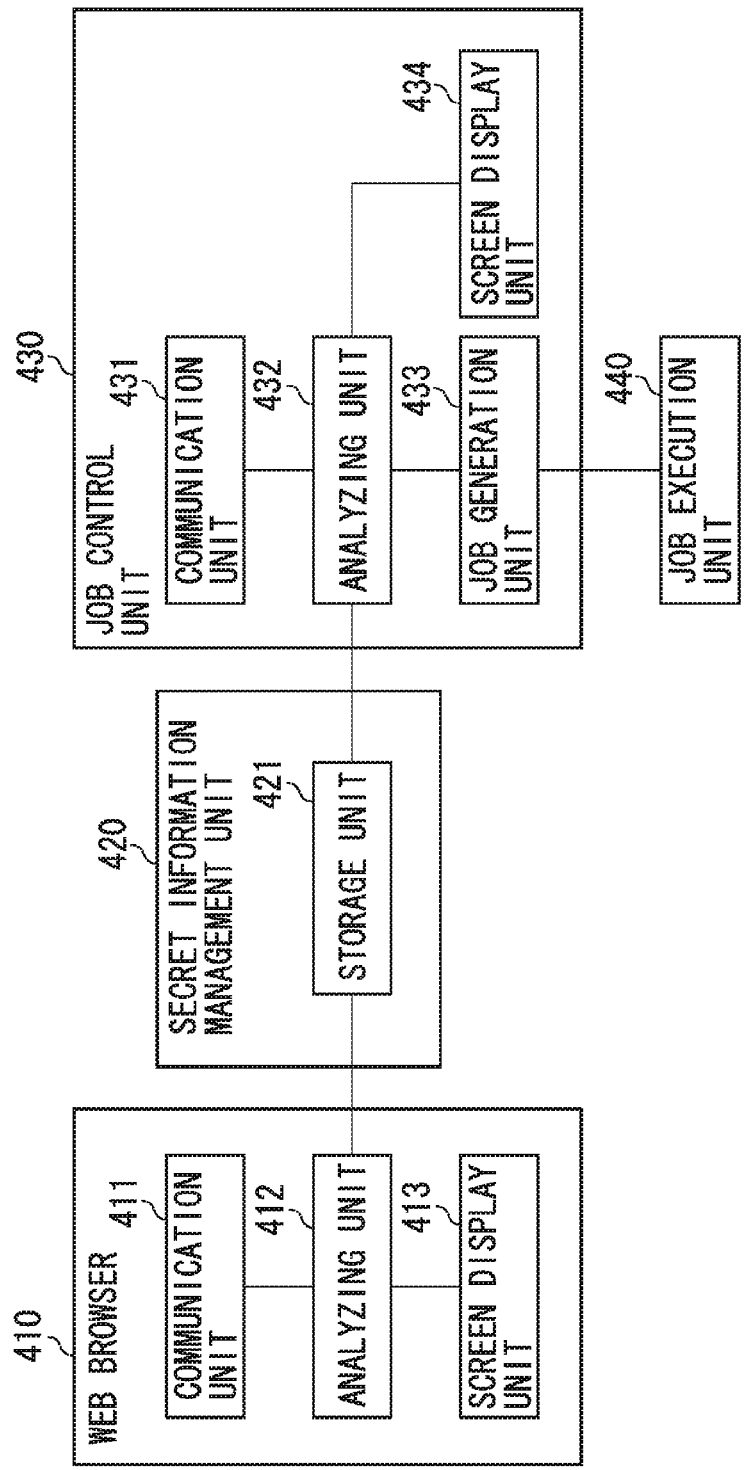
FIG. 15 illustrates another software configuration of the MFP.

FIG. 15 illustrates a functional configuration of a program to be executed on the MFP 101 according to the third exemplary embodiment. The functional configuration of the program illustrated in FIG. 15 is different from the functional configuration of the program illustrated in FIG. 4 used in the first exemplary embodiment in that the job control unit 430 includes a screen display unit 434.

Figure 16:
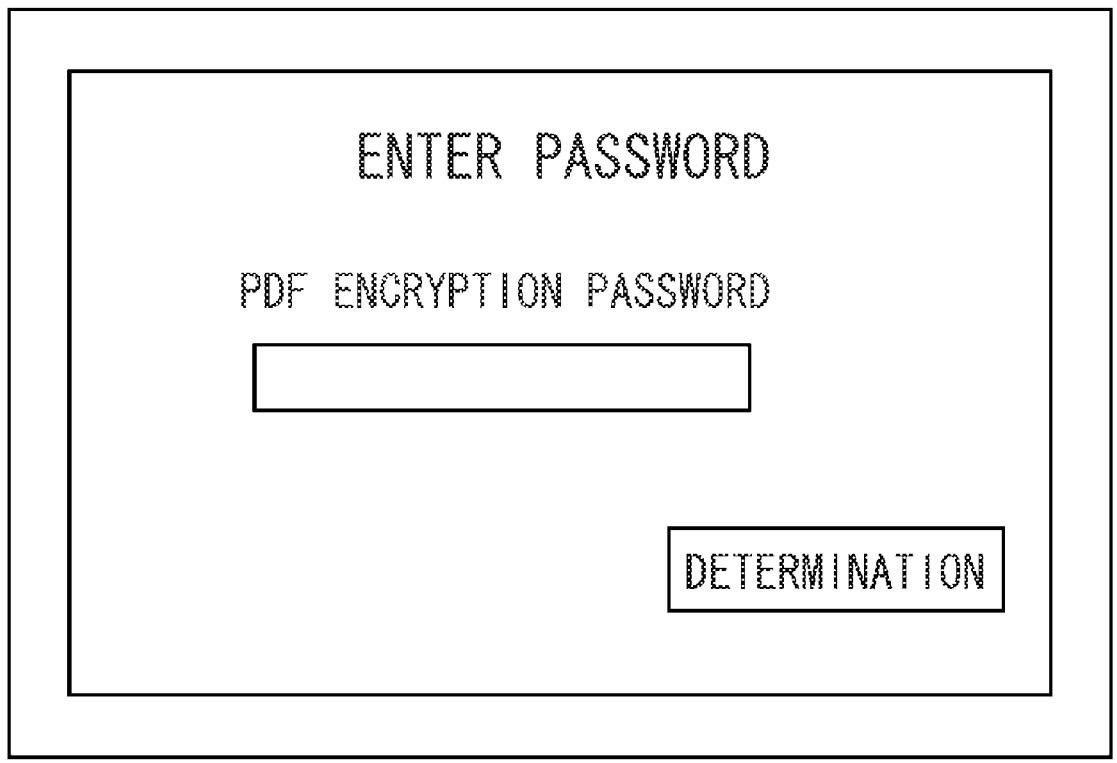
FIG. 16 illustrates a secret information input screen.

FIG. 16 illustrates an example of a secret information input screen displayed by the screen display unit 434. Via the secret information input screen, the encryption password is entered. The secret information input screen illustrated in FIG. 16 is, different from the web browser screen as illustrated in FIG. 7, displayed after the communication unit 431 receives the SOAP request message. The information input on the screen is not transmitted to the web server 102. The secret information input screen includes a secret information input field and a determination button. The secret information input field is a field into which, for example, a password for encrypting the PDF is entered. The determination button is configured to determine information input into the secret information input field.

Figure 19:
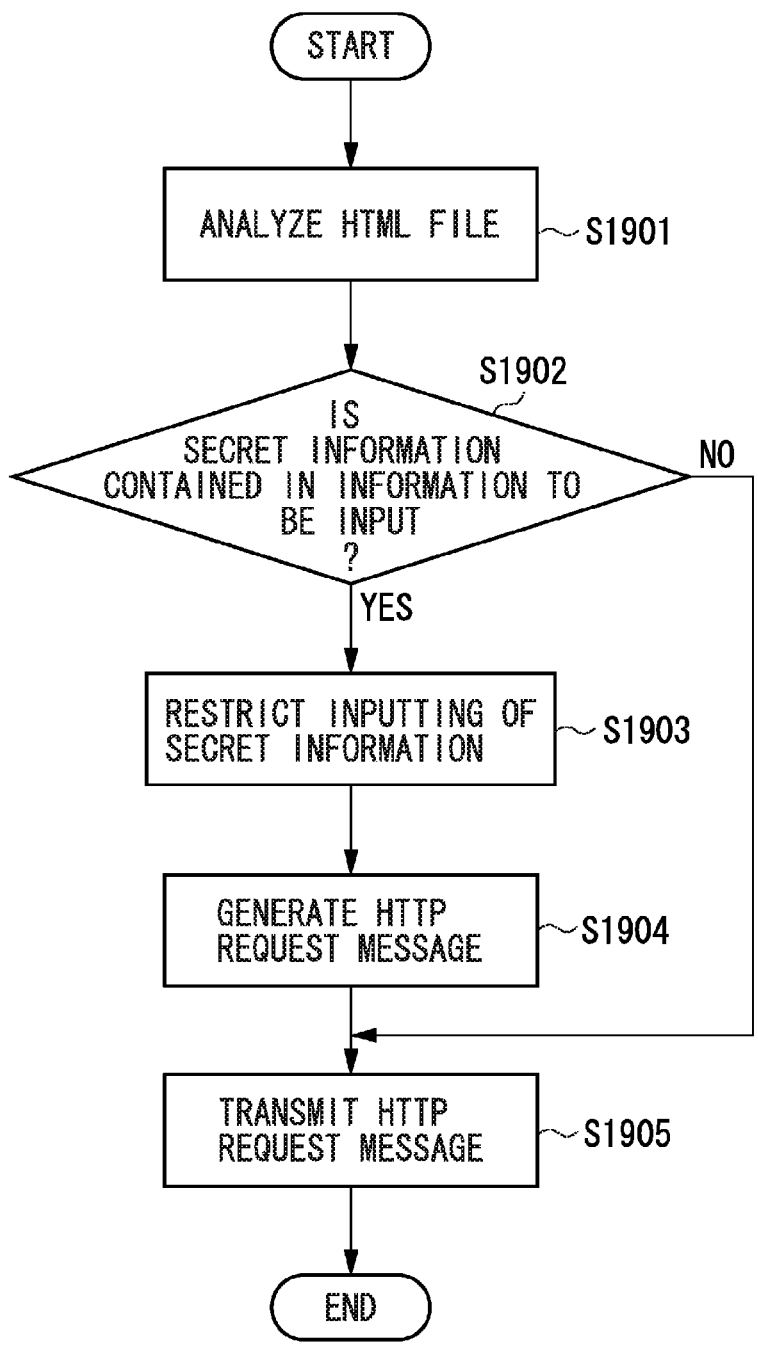
FIG. 19 illustrates a sequence of processing before a function of the MFP is executed by using a screen of the web browser.

A flow of processing in which the MFP 101 transmits the HTTP request message to the web server in the present exemplary embodiment is described with reference to FIG. 19.

In step S1901, the analyzing unit 432 analyzes the received HTML file and determines whether the information input into the input field is secret information. In step S1902, whether secret information is contained in the information to be input into the input field is determined and, in a case where it is determined that the secret information is contained in step 1902 (YES in step S1902), the processing proceeds to step S1903.

In a case where it is determined that the secret information is contained in step S1902, then in step S1903, the screen display unit 413 restricts inputting of information into the secret information input field. The restriction of the input processing further restricts the user from inputting the secret information via the web browser screen or invalidates the input processing. For example, the encryption password entering box of the web browser screen illustrated in FIG. 7 is gray-out to place the apparatus under the state of restricting input processing. As it is described above, in the third exemplary embodiment, since nothing is input into the secret information input field of the web browser screen, the secret information is not transmitted to the web server 102.

In step S1904, the analyzing unit 412 generates the HTTP request message. In step S1905, the communication unit 411 transmits the HTTP request message to the web server 102.

Figure 18:
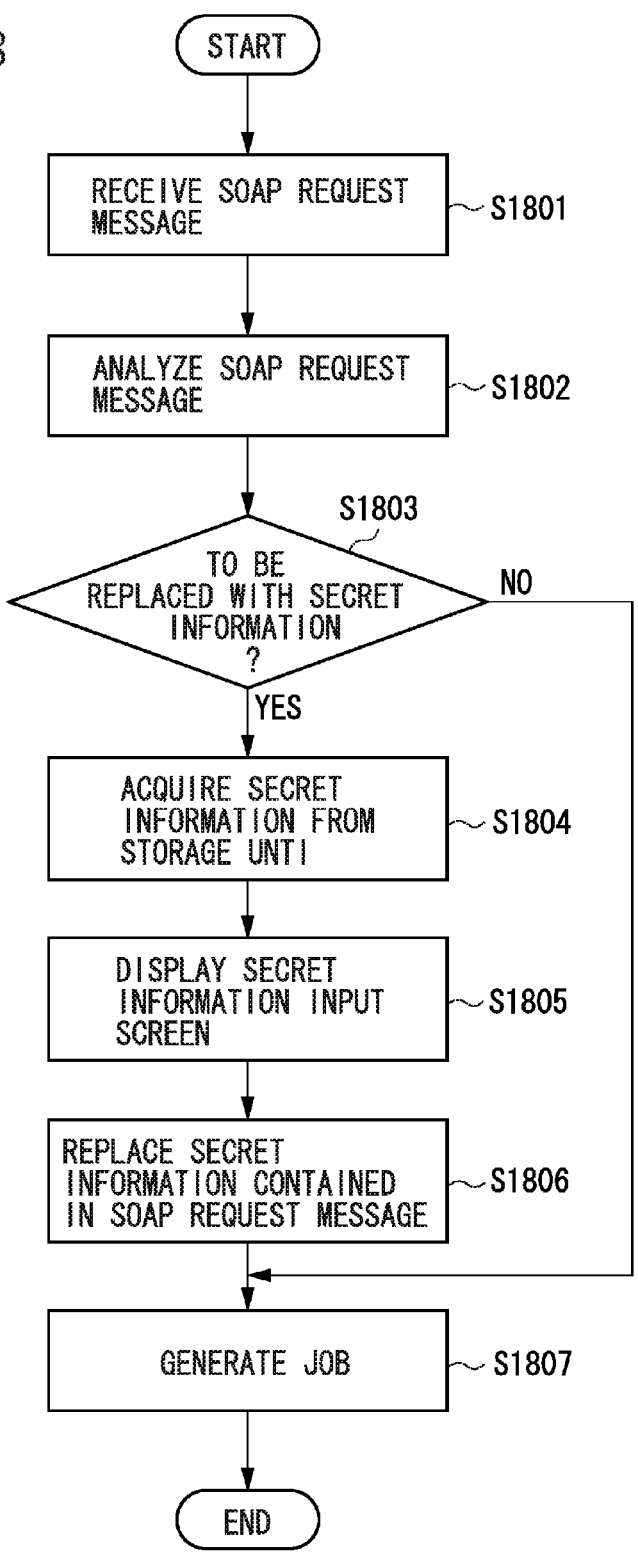
FIG. 18 illustrates another flow of the SOAP request processing.

Now, a flow of processing the SOAP request message received by the MFP 101 from the web server 102 is described below with reference to the flow chart of FIG. 18. Processing in each of steps S1801 and S1802 is similar to the corresponding one of steps S1101 and S1102 of the flow chart of FIG. 11, so that the description thereof is omitted here.

Figure 17:
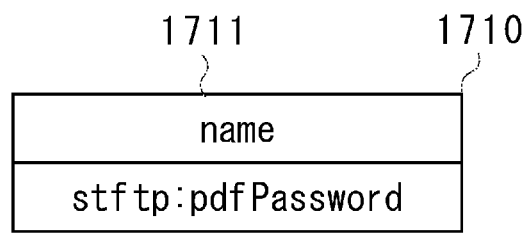
FIG. 17 illustrates yet another secret information list.

In step S1803, the analyzing unit 432 of the job control unit 430 acquires the secret information stored in the storage unit 421 of the secret information management unit 420. In a case where the secret information list illustrated in FIG. 17 is stored in the storage unit 421 (YES in step S1803), the analyzing unit 432 acquires the secret information having the name attribute of "stftp:pdfPassword". Thus acquired secret information is deleted from the secret information list.

In step S1804, the screen display unit 434 of the job control unit 430 displays a secret information input screen corresponding to the secret information acquired in step S1803. In a case where the name attribute of the secret information is "stftp:pdfPassword", the name attribute is determined as the encryption PDF password and the encryption PDF password entry screen illustrated in FIG. 16 is displayed. When the determination button of the encryption PDF password entry screen is clicked, the screen display unit 434 notifies the secret information input into the secret information input field to the analyzing unit 432.

In the third exemplary embodiment, the screen display unit 434 displays the secret information input screen on the operation unit 220 after the screen display unit 434 receives the processing request from the web server 102. Then, the screen display unit 434 performs control such that the encryption password entered via the web browser screen illustrated in FIG. 7 is entered after the screen display unit 434 receives the processing request. With such control, the value attribute value of the secret information is not necessarily stored in the storage unit 421, and thus the amount of information to be stored in the HDD 214 can be reduced.

In step S1805, the analyzing unit 432 of the job control unit 430 replaces the secret information contained in the SOAP request message with the secret information notified from the screen display unit 434 in step S1804. In a case where there is an element which has a value identical to that of the name attribute of the secret information acquired from the storage unit 421 in the SOAP request message, a content of the element is replaced with the secret information notified from the screen display unit 434. In the case of the SOAP request message illustrated in FIG. 12, the content of "000000000" of the element of "stftp:pdfPassword" is replaced with the secret information input via the secret information input screen. In step S1806, the secret information input in step S1805 is replaced with the content of "00000000" of the element of the "stftp:pdfPassword". In step S1807, similar to step S1106, a job is generated and executed according to the SOAP request message after it is replaced.

In the third exemplary embodiment, display of the secret information input screen after receiving the processing request enables to reduce a risk that the secret information is transmitted to the web server.

In the third exemplary embodiment, the job control unit 430 is configured, but not limited, to include the screen display unit 434. The HTML file representing the secret information input screen preliminary stored in the storage unit 421 of the secret information management unit 420 may be displayed by the screen display unit 413 of the web browser 410.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-184798 filed Aug. 7, 2009, which is hereby incorporated by reference herein in its entirety.

What is claimed is:

1. An image processing apparatus comprising:
at least one processor coupled via a bus to a memory, the processor being programmed to control:
 a display unit configured to display an operation screen based on a Web page received from a Web server via a network;
 an input unit configured to input data via the operation screen displayed by the display unit from a user;
 a communication unit configured to transmit the inputted data to the Web server, and to receive a processing request generated based on the inputted data from the Web server;
 an image processing unit configured to convert image data into an encryption file; and
 a control unit configured to extract secret information which is included in the inputted data and to store the secret information in a storage unit,
wherein the communication unit transmits the inputted data, from which the secret information is extracted, to the Web server and
wherein the control unit is configured to control the image processing unit to convert the image data into the encryption file based on the processing request received from the Web server, to set, to the encryption file, the secret information in the storage unit which is extracted from the inputted data, and to transmit the encryption file to which the secret information has been set to an external device.

2. The image processing apparatus according to claim 1, wherein the control unit generates identification information about the secret information,
wherein the storage unit stores the secret information and the generated identification information in association with each other, and wherein the communication unit transmits the generated identification information.

3. The image processing apparatus according to claim 2, wherein the control unit replaces, after the communication unit receives the processing request, the identification information contained in the processing request with the secret information stored in the storage unit,
wherein the image processing unit performs image processing based on the replaced processing request.

4. The image processing apparatus according to claim 1, wherein the image processing unit includes encrypting input image data, and
wherein the secret information includes an encryption key for encrypting the input image data.

5. The image processing apparatus according to claim 1, wherein the Web page includes a Hyper Text Markup Language (HTML) file described by HTML.

6. The image processing apparatus according to claim 5, wherein the display unit displays a field into which a user is allowed to input the input information based on the description of the HTML file,
wherein the HTML file includes a description about an attribute of the input information to be input into the field, and
wherein the control unit extracts the secret information by analyzing the attribute described in the HTML file.

7. The image processing apparatus according to claim 1, wherein the communication unit transmits the inputted data not including the secret information extracted by the control unit, to the Web server.

8. An image processing method for an image processing apparatus, the image processing method comprising:
displaying an operation screen based on a Web page received from a Web server via a network;
inputting data via the displayed operation screen from a user;
transmitting the inputted data to the Web server;
receiving a processing request generated based on the inputted data from the Web server;
converting image data into an encryption file; and
extracting secret information which is included in the inputted data;
storing the secret information in a storage unit;
transmitting the inputted data, which the secret information is extracted, to the Web server; and
converting the image data into the encryption file based on the processing request received from the Web server, to set, to the encryption file, the secret information in the storage unit which is extracted from the inputted data, and transmitting the encryption file to which the secret information has been set to an external device.

9. A non-transitory computer-readable storage medium storing computer-executable instructions for causing a computer to perform a method for controlling an image processing apparatus, the computer-executable instructions comprising:
displaying an operation screen based on a Web page received from a Web server via a network;
inputting data via the displayed operation screen from a user;
transmitting the inputted data to the Web server;
receiving a processing request generated based on the inputted data from the Web server;
converting image data into an encryption file; and
extracting secret information which is included in the inputted data;
storing the secret information in a storage unit;
transmitting the inputted data, which the secret information is extracted, to the Web server; and
converting the image data into the encryption file based on the processing request received from the Web server, to set, to the encryption file, the secret information in the storage unit which is extracted from the inputted data, and transmitting the encryption file to which the secret information has been set to an external device.

\* \* \* \* \*